United States Patent
Nakabayashi

(10) Patent No.: US 7,561,602 B1
(45) Date of Patent: Jul. 14, 2009

(54) APPARATUS FOR PROCESSING PACKET, AND MEDIUM STORING PACKET PROCESSING PROGRAM

(75) Inventor: Jiro Nakabayashi, Suginami-ku (JP)

(73) Assignee: Sharp Kabushiki Kaisha, Osaka (JP)

( * ) Notice: Subject to any disclaimer, the term of this patent is extended or adjusted under 35 U.S.C. 154(b) by 1481 days.

(21) Appl. No.: 10/031,200

(22) PCT Filed: Aug. 2, 2000

(86) PCT No.: PCT/JP00/05167

§ 371 (c)(1),
(2), (4) Date: Jan. 15, 2002

(87) PCT Pub. No.: WO01/11832

PCT Pub. Date: Feb. 15, 2001

(30) Foreign Application Priority Data

Aug. 3, 1999 (JP) .................................. 11-220191

(51) Int. Cl.
*H04J 3/06* (2006.01)
(52) U.S. Cl. .................. 370/516; 370/412; 370/503
(58) Field of Classification Search .................. 370/412, 370/503, 516
See application file for complete search history.

(56) References Cited

U.S. PATENT DOCUMENTS

| | | | |
|---|---|---|---|
| 4,270,183 A * | 5/1981 | Robinson et al. .............. 710/57 |
| 4,453,247 A | 6/1984 | Suzuki et al. |
| 5,287,182 A * | 2/1994 | Haskell et al. ............... 348/500 |
| 5,553,061 A * | 9/1996 | Waggener et al. ......... 250/491.1 |
| 5,778,175 A * | 7/1998 | Paul et al. .................... 709/250 |
| 5,966,387 A * | 10/1999 | Cloutier ...................... 370/516 |
| 6,452,950 B1 * | 9/2002 | Ohlsson et al. ............. 370/516 |
| 6,480,477 B1 * | 11/2002 | Treadaway et al. .......... 370/314 |
| 2002/0101885 A1 * | 8/2002 | Pogrebinsky et al. ....... 370/516 |

FOREIGN PATENT DOCUMENTS

| | | |
|---|---|---|
| JP | 4-188929 A | 7/1992 |
| JP | 6-30043 A | 2/1994 |
| JP | 9-247208 A | 9/1997 |
| JP | 11-163892 A | 6/1999 |
| JP | 11-215182 A | 8/1999 |
| JP | 2000-69016 A | 3/2000 |
| WO | 95/22233 | 8/1995 |

\* cited by examiner

*Primary Examiner*—Jason E Mattis
(74) *Attorney, Agent, or Firm*—Nixon & Vanderhye, PC

(57) ABSTRACT

Packets received through a network interface 104 is stored into a receiving buffer 108. Are production controller 106 checks the current state of receiving buffer 108 and performs a reproduction process mentioned below. The data in receiving buffer 108 is transferred to a decoder 109 in accordance with instruction from reproduction controller 106 and decoded as voice sound, D/A converted by a D/A converter 110 and then output as voice sound from a speaker 102. The clock for D/A conversion is supplied from a reproduction clock CLK 107. This configuration is free from overflow and underflow of the receiving buffer due to difference in clocks between the transmitting and receiving ends, and prevents the occurrence of packet jitter so as to avoid voice sound breaks.

20 Claims, 17 Drawing Sheets

FIG. 10
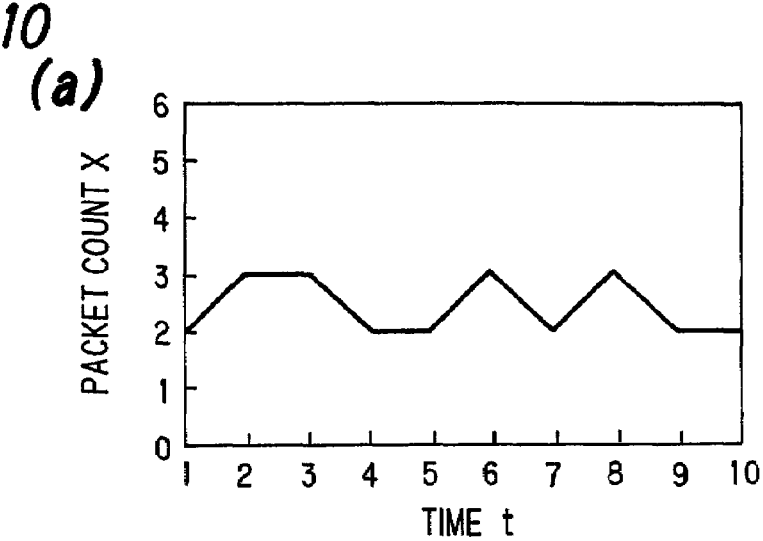
(a)
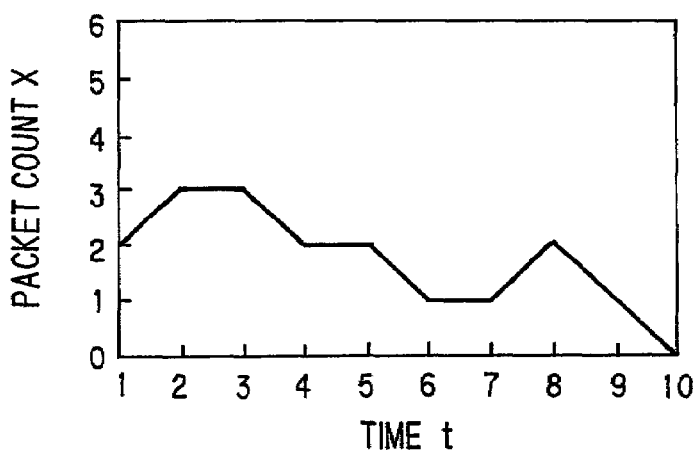
(b)
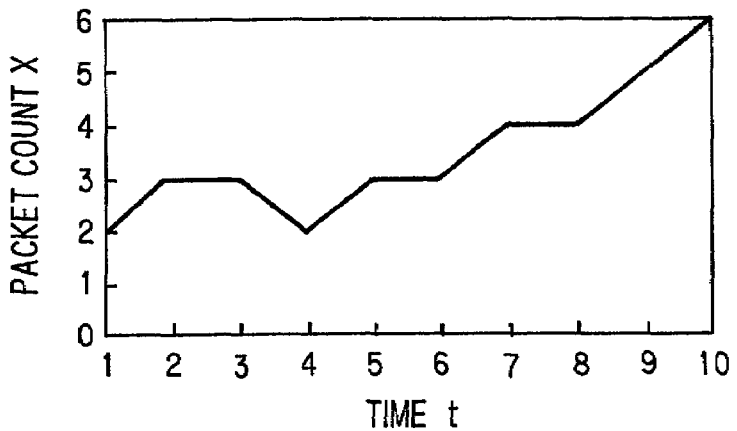
(c)

FIG. 12
(a)
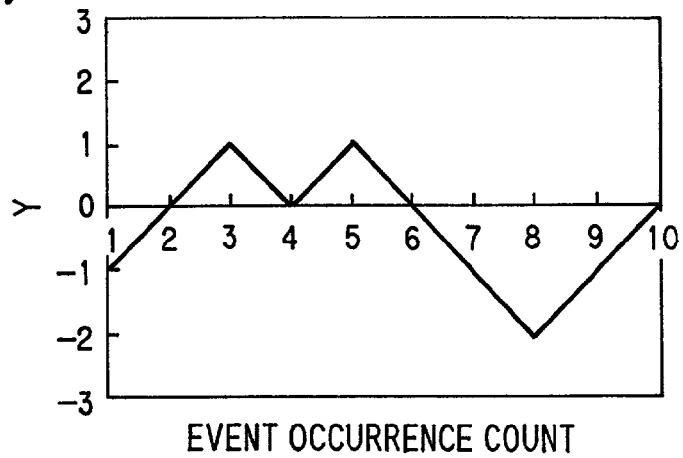
(b)
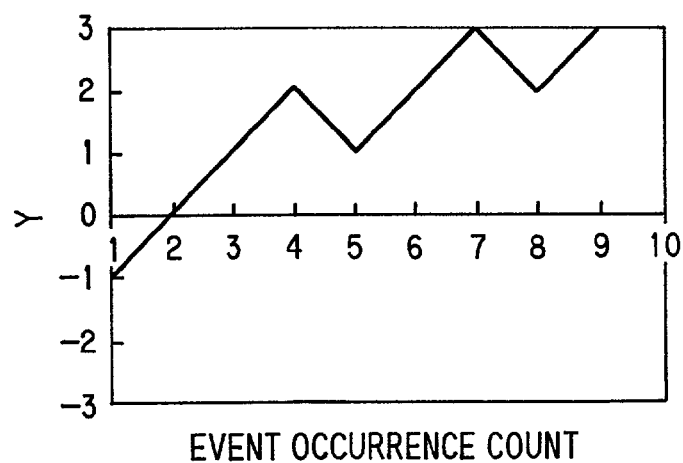
(c)
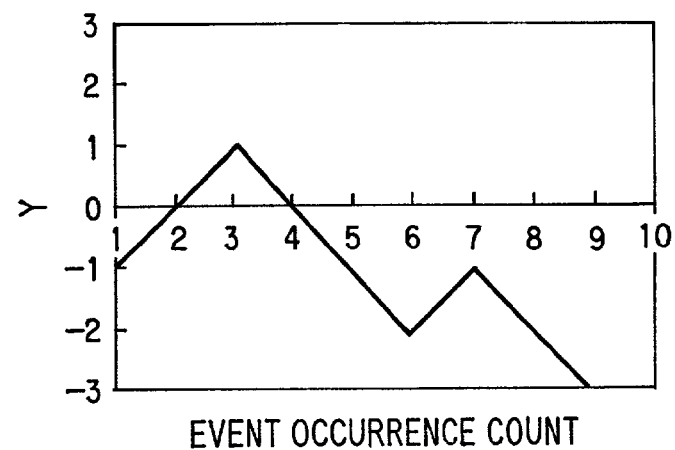

APPARATUS FOR PROCESSING PACKET, AND MEDIUM STORING PACKET PROCESSING PROGRAM

CROSS-REFERENCE TO RELATED APPLICATIONS

This application is the national stage of PCT/JP00/05167, filed Aug. 2, 2000, which designates the United States and which claims priority from JP 11-220191, filed Aug. 3, 1999.

TECHNICAL FIELD

The present invention relates to a packet processor and a recording medium with packet processing programs thereon, which are suitable for terminals and gateway devices for communicating voice and music by way of packet-based networks such as the Internet, etc.

BACKGROUND ART

Voice communication services, represented by telephone, have been conventionally offered by telephone communications companies establishing communications networks on their own accounts.

FIG. 13 shows an example of a communications network for offering conventional telephone services. The telephone network is comprised of regional centers 801 at the topmost layer, primary centers 802 connected to one regional center, toll centers 803 and terminal offices 804, each of which is connected to subscribers 805 as the users. Regional centers 801 form mesh networks while primary centers 802, toll centers 803 and terminal offices 804 form star-like networks.

In the telephone network, each of the centers and offices has an exchange, and when a transmission link needs to be established between exchanges, line switching is performed by time division multiplex system of the communication band necessary for the connection. FIG. 14 shows the concept of line switching based on time division multiplex system. A telephone 1001 used by a user is connected to an exchange 1002. A transmission path 1003 having a predetermined band is provided to connect between the exchanges. The calls among a plurality of telephones 1001a to 1001h are realized through the transmission paths based on time division multiplex system. It is understood from FIG. 14 that calls are established between phone 1001a and phone 1001d, phone 1001b and phone 1001e, and phone 1001c and phone 1001h while the transmission path between the exchanges still has empty areas. In time division multiplex system, since a multiple number of signals to be exchanged between terminals are multiplexed using frames 1004 each having a predetermined period unit, the band for a call once established between terminals will be secured until the call terminates. The unit of frame 1004 of division multiplexing is typically 8 KHz (125 psec.). Since this relation is held for all the connected exchanges, there is no need to pay attention to synchronization between the terminals if each telephone terminal transmits and receives data based on this signal.

In this way, in the line switching network used in the telephone network or the like, the entire network is operated based on the same reference signal, so that the bandwidth and delay time between connected terminals are guaranteed.

On the other hand, because of the spread of PCs and the Internet, communications through electronic mail or through WWW (world wide web) have become intensively developed. FIG. 15 shows an example of communications among PCs over the Internet. On the Internet, all information is exchanged in packets. PCs 904a and 904b connected within an intranet 901 is connected to the Internet 905 at an Internet provider 903a by way of a router or gateway 902. Ordinary users of PCs 904c and 904d access to the Internet 905 by way of Internet Providers 903b and 903c using the telephone line via PPP.

Communications on the Internet are performed using TCP/UDP/IP. FIG. 16 shows the concept for routing data on the Internet. Each terminal monitors the status of the network and sends out packets having a destination address (IP address) attached thereon onto the network when the network has any empty channel. Packets from terminals connected to the network are checked as to their IP addresses and routed by routers so that they will be transferred to the routers that are located nearest to their destinations. The packets are thus transferred to those routers, where they are checked as to their addresses, and further, transferred to associated terminals.

In this way, data communication through the Internet by routing makes it possible to transmit and receive data as long as there is an empty channel allowing for packet transmission on the network, so that a large amount of data can be communicated at low cost.

In recent years, there has been an increasing tendency toward using applications of the Internet for real-time operations such as IP phone (VoIP), teleconference, IP/TV, etc., in addition to use of non-real-time data communications such as electronic mail and WWW. When the Internet is used in this manner, the problem of packet jitter due to routing occurs.

The situation of occurrence of jitter will be explained with reference to FIG. 16. Packets 1102a and 1102b sent out respectively from PCs 1101a and 1101b reach a router 1103a. In order to transfer the packets to their own destinations, router 1103a sends out packets 1102a and 1102b in the order in which they reached it. No jitter will arise if the packets from each terminal just fit in the transmission intervals between the packets from the other terminal. However, if two packets are sent out at almost the same timing, the packet which has first arrived at router 1103a is processed first while the packet from the other terminal is kept waiting during that time. For example, as shown in FIG. 16, suppose that packets 1102a are sent out to router 1103a at intervals of period 1104a while packets 1102b are sent out at intervals of period 1104b. Router 1103a processes the packets and sends them out to the router 1103b in the order in which they reached it. First, packet 1102b and then packet 1102a are processed. Therefore, packet 1102a is kept waiting from its arrival until the process of packet 1102b is completed. As a result, the transmission intervals become different from those at which the packets were send out from PC1101a and 1100b. At router 1130b, packets 1102a and 1102b are separated and sent out to respective destinations PC1101c and 1101d. That is, the transmission interval of packets 1102a changes from 1104a to 1104c and the transmission interval of packets 1102b changes from 1104b to 1104d, which will cause jitter.

As stated above, packet communication such as through the Internet causes packet jitter due to routing over the network. When packet jitter occurs, voice sound comes in with breaks in the case of IP phone, for example. For improvement against this, in general a buffer is provided on the receiver side so that data can be reproduced after a certain amount of data has been stored. However, since jitter on the network depends on the traffic in the network during the communication, breaks occur if the buffer has a lower storage capacity whereas delay increases if the buffer has a higher storage capacity, degrading the characteristics of conversation on IP phone.

Another problem with packet communication is the difference in clock rate between the transmitter end and the receiver end. The problem with real-time operations in packet communication will be described with reference to FIG. 17. A transmitting terminal 1202a is comprised of a microphone 1211, an A/D converting circuit 1212, an encoder circuit 1213, a network interface 1214a while a receiving terminal 1202b is comprised of a network interface 1214b, a decoder circuit 1215, an D/A converting circuit 1216 and a speaker 1217. In packet communication, since each terminal does not operate in synchronism with the clock on the network as in a line exchange configuration, individual terminals operate in accordance with their own clocks 1201a and 1201b, respectively. Here, if there is a difference in clock rate for sampling voice sound between the transmitter side and receiver side, data overflow or underflow will occur on the receiver side.

In order to solve this, in the packet communication, there is a method of reproducing the reference clock, which is used for audio and video transmission based on ATM in MPEG2. The overall configuration will be described with reference to FIG. 18. Also in ATM, data is transmitted in packets (cells) as in the Internet mentioned above. In MPEG2 transmission based on ATM, a 27 MHz clock 1301 is provided for the terminal so as to transmit data together with reference clock information 1302 as clock reference signal information (PCR) 1303. The receiving terminal reproduces the data using a PLL 1304 based on the clock reference signal information (PCR) 1303. With this arrangement, the reference clock information 1302 on the transmitter side can be reproduced on the receiver side so that no buffer overflow and underflow will occur due to clock discrepancy.

This method is markedly effective as a method of sending a reference clock to a destination terminal by packet communication having no common clock, but needs to provide a 27 MHz clock on the transmitter side and a high-precision PLL on the receiver side, which are too expensive to be provided for PCs and the like. Further, it is necessary for this method to send an exact PCR from the transmitter side, and this method is not effective for connection with a terminal which cannot send this information exactly.

In order to solve the above problems, it is therefore an object of the present invention to provide an inexpensive packet processor and a recording medium with packet communication processing programs recorded thereon, wherein no receiving buffer overflow and underflow due to clock discrepancy between the transmission and reception ends will occur so as to prevent occurrence of packet jitter and hence voce sound with breaks.

DISCLOSURE OF INVENTION

In order to solve the above problems, the present invention is configured as follows:

The first invention is a packet processor for processing packets of data received via a network to reproduce the data, comprising: a receiving buffer for storing received packets; a reproducing means for reproducing data of the packets based on a reproduction clock; and a control means for performing control so as to reproduce data without breaks, and is characterized in that the control means controls the packets having been stored in the receiving buffer by their number, holds a reference value for the number of received packets, which is determined beforehand, and causes the reproducing means to start data reproduction when the number of packets exceeds the reference number.

The second invention is the packet processor defined in the first invention, wherein the control means monitors the state of the receiving buffer and collects, when the data in the buffer is used up, data up to the level corresponding to the reference value before causing the reproducing means to restart data reproduction.

The third invention is the packet processor defined in the first invention, wherein the control means monitors the state of the receiving buffer and discards, when the data in the buffer exceeds the predetermined buffer size, a fixed amount of data from the buffer.

The fourth invention is the packet processor defined in the first invention, wherein the control means monitors the state of the receiving buffer and modifies, when the data in the buffer is used up, the reference value for the number of received packet at which reproduction of data is started, upon the next reproduction of data.

The fifth invention is the packet processor defined in the first invention, wherein the control means monitors the state of the receiving buffer and modifies, when the data in the buffer exceeds the predetermined buffer size, the size of the receiving buffer.

The sixth invention is the packet processor defined in any one of the second through fifth inventions, wherein the control means monitors the number of packets in the receiving buffer at intervals of a predetermined time period, and when the result shows increase or decrease in the number of packets with time, the control means, based on the result, modifies the receiving buffer size and the reference value for the number of received packets at which reproduction of data is started.

The seventh invention is the packet processor defined in any one of the second through fifth inventions, wherein the control means monitors the number of packets in the receiving buffer at intervals of a predetermined time period, and when the result shows increase or decrease in the number of packets with time, the control means, based on the result, modifies the clock for data reproduction.

The eighth invention is the packet processor defined in the fourth or fifth invention, wherein the control means records the modifications of the reference value for the number of received packets or the receiving buffer size, continuously from the start of the communication, and if modifications of one type successively occur, the control means, based on the result, modifies the receiving buffer size and the reference value for the number of received packets at which reproduction of data is started.

The ninth invention is the packet processor defined in the fourth or fifth invention, wherein the control means records the modifications of the reference value for the number of received packets or the receiving buffer size, continuously from the start of the communication, and if modifications of one type successively occur, the control means, based on the result, modifies the clock for data reproduction.

The tenth invention is a recording medium holding a packet processing program for use in a packet processor for processing packets of data received via a network to reproduce the data, wherein the packet processor comprises a receiving buffer for storing received packets; a reproducing means for reproducing data of the packets based on a reproduction clock; and a control means for performing control so as to reproduce data without breaks, and the packet processing program is characterized in that the control means is adapted to control the packets having been stored in the receiving buffer by their number, hold with a reference value for the number of received packets, which is determined beforehand, and cause the reproducing means to start data reproduction when the number of packets exceeds the reference value.

The eleventh invention is the recording medium holding a packet processing program defined in the tenth invention, wherein the control means is adapted to monitor the state of the receiving buffer and collect, when the data in the buffer is used up, data up to the level corresponding to the reference value before causing the reproducing means to restart data reproduction.

The twelfth invention is the recording medium holding a packet processing program defined in the tenth invention, wherein the control means is adapted to monitor the state of the receiving buffer and discard, when the data in the buffer exceeds the predetermined buffer size, a fixed amount of data from the buffer.

The thirteenth invention is the recording medium holding a packet processing program defined in the tenth invention, wherein the control means is adapted to monitor the state of the receiving buffer and modify, when the data in the buffer is used up, the reference value for the number of received packet at which reproduction of data is started, upon the next reproduction of data.

The fourteenth invention is the recording medium holding a packet processing program defined in the tenth invention, wherein the control means is adapted to monitor the state of the receiving buffer and modify, when the data in the buffer exceeds the predetermined buffer size, the size of the receiving buffer.

The fifteenth invention is the recording medium holding a packet processing program defined in any one of the eleventh through fourteenth inventions, wherein the control means is adapted to monitor the number of packets in the receiving buffer at intervals of a predetermined time period and when the result shows increase or decrease in the number of packets with time, the control means is operated to modify, based on the result, the receiving buffer size and the reference value for the number of received packets at which reproduction of data is started.

The sixteenth invention is the recording medium holding a packet processing program defined in any one of the eleventh through fourteenth inventions, wherein the control means is adapted to monitor the number of packets in the receiving buffer at intervals of a predetermined time period and when the result shows increase or decrease in the number of packets with time, the control means is operated to modify, based on the result, the clock for data reproduction.

The seventeenth invention is the recording medium holding a packet processing program defined in the thirteenth or fourteenth invention, wherein the control means is adapted to record the modifications of the reference value for the number of received packets or the receiving buffer size, continuously from the start of the communication, and if modifications of one type successively occur, the control means is operated to modify, based on the result, the receiving buffer size and the reference value for the number of received packets at which reproduction of data is started.

The eighteenth invention is the recording medium holding a packet processing program defined in the thirteenth or fourteenth invention, wherein the control means is adapted to record the modifications of the reference value for the number of received packets or the receiving buffer size, continuously from the start of the communication, and if modifications of one type successively occur, the control means is adapted to modify, based on the result, the clock for data reproduction.

It is expected that real-time applications using the Internet such as IP phones etc., will become more and more popular. Use of the packet processor of the present invention provides a simple method which can realize receiving buffer control for reproducing data such as voice sound, music etc., in an optimal way by absorbing packet jitter which varies over time depending on the network status. Since none of the temporal information from the transmitting side, which has been used in the conventional configuration, is used in the packet processor of the present invention, the optimal control can be achieved on the receiving side only.

Also, since difference in reference clocks between the terminal ends, which may cause a problem in packet communication, can be detected by only monitoring the status of the receiving buffer at regular intervals or when a particular event has occurred, it is possible to modify the difference in a simple, low-cost method without the necessity of a complex, expensive PLL circuit and/or high-precision reference clock.

Use of a recording medium with the packet processing program of the present invention recorded thereon enables jitter of received packets and clock difference, which could only be handled by the terminals with dedicated hardware, to be controlled in software by multi-purpose terminals such as PCs and the like.

BRIEF DESCRIPTION OF DRAWINGS

FIG. 10 is an illustrative view showing an example of a determining method when the status of a receiving buffer is monitored every fixed period;

FIG. 12 is another example of a determining method when the status of a receiving buffer is monitored every fixed period;

BEST MODE FOR CARRYING OUT THE INVENTION

The embodiment of the present invention will be described hereinbelow with reference to the drawings.

Figure 1:
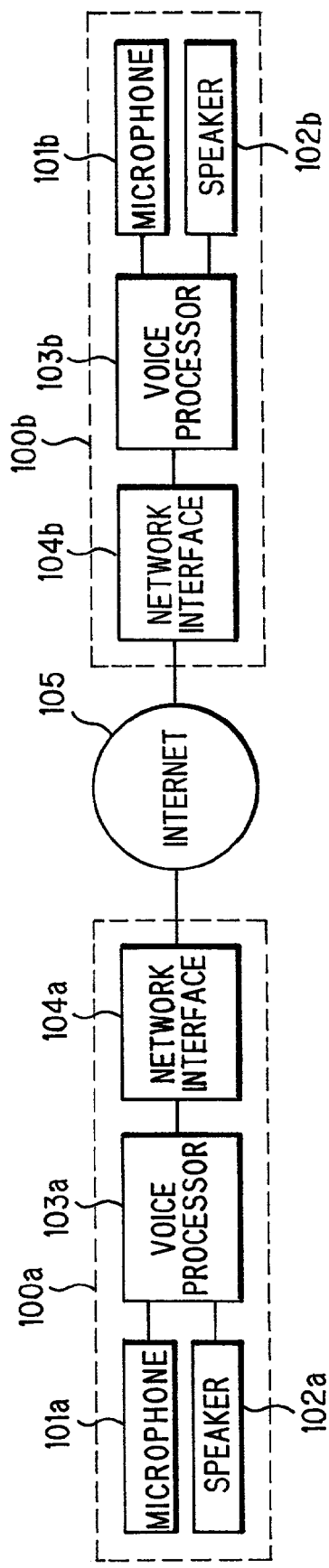
FIG. 1 is a block diagram showing a communication system made up of voice packet communication apparatuses of the present invention.
Figure 2:
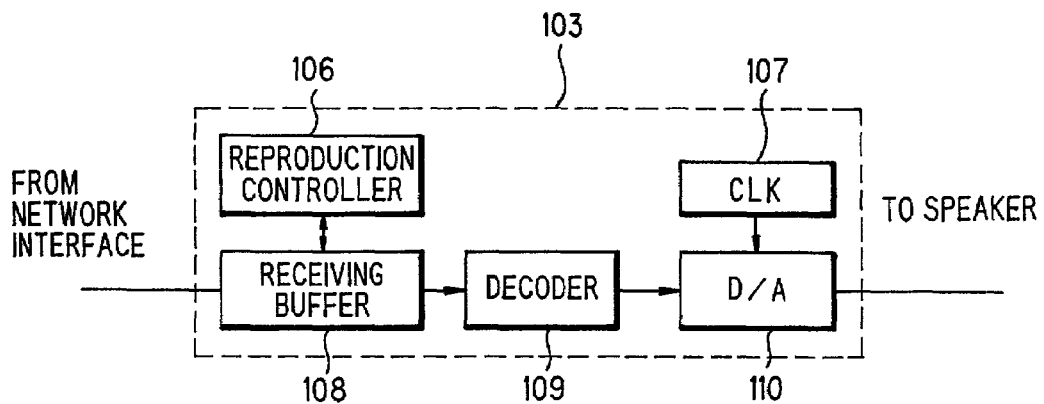
FIG. 2 is block diagram showing a voice processor used this communication apparatus.
Figure 3:
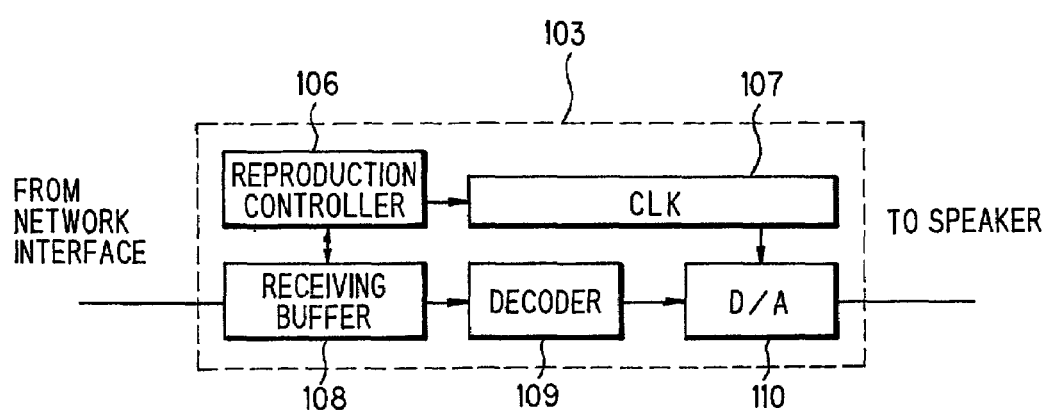
FIG. 3 is a block diagram showing another voice processor used in this communication apparatus.

FIG. 1 is a block diagram showing a communication system of voice packet communication apparatus of the present invention, FIGS. 2 and 3 are block diagrams showing voice processors used in this communication system.

The communication system shown in FIG. 1 comprises voice packet communication apparatus 100a and 100b and the Internet 105. Voice packet communication apparatus (terminal units) 100a and 100b are comprised of microphones 101a and 101b, speakers 102a and 102b, voice processors 103a and 103b serving as packet processors and network interfaces 104a and 104b. A voice sound input through microphone 101a is A/D converted through voice processor 103a and encoded as required, then packetized so that the packets are transmitted from network interface 104a to terminal unit 100b by way of Internet 105. The packets sent out from terminal unit 100a are processed through network interface 104b and buffered in voice processor 103b, then decoded as required, and D/A converted so as to be output from speaker 102b.

The configurations of voice processor 103 are shown in detail in FIGS. 2 and 3. FIG. 2 shows a configuration for controlling the receiving buffer to reproduce voice data in an optimal way so as to absorb the jitter. FIG. 3 shows a configuration for modifying the clock for reproduction based on the state of the receiving buffer so as to absorb the difference in clocks between terminal ends. Voice processor 103 comprises a reproduction controller 106, a clock generator 107, a receiving buffer 108, a decoder 109 and a D/A converter 110. Decoder 109 and D/A converter 110 function as a data reproducing means to reproduce data in packets.

In FIG. 2, packets received from network interface 104 are stored into receiving buffer 108. Reproduction controller 106 checks the state of receiving buffer 108 and performs a reproduction process mentioned below. The data in receiving buffer 108 is transferred to decoder 109 in accordance with instruction from reproduction controller 106 and decoded as voice sound, D/A converted by D/A converter 110 and then output as voice sound from speaker 102. The clock for D/A conversion is supplied from a reproduction clock CLK 107.

FIG. 3 shows a configuration which, in addition to the control shown in FIG. 2, decodes voice sound by modifying the frequency of reproduction clock CLK 107 in accordance with instruction from reproduction controller 106 so that data of received packets to be reproduced will not cause overflow or underflow.

Figure 4:
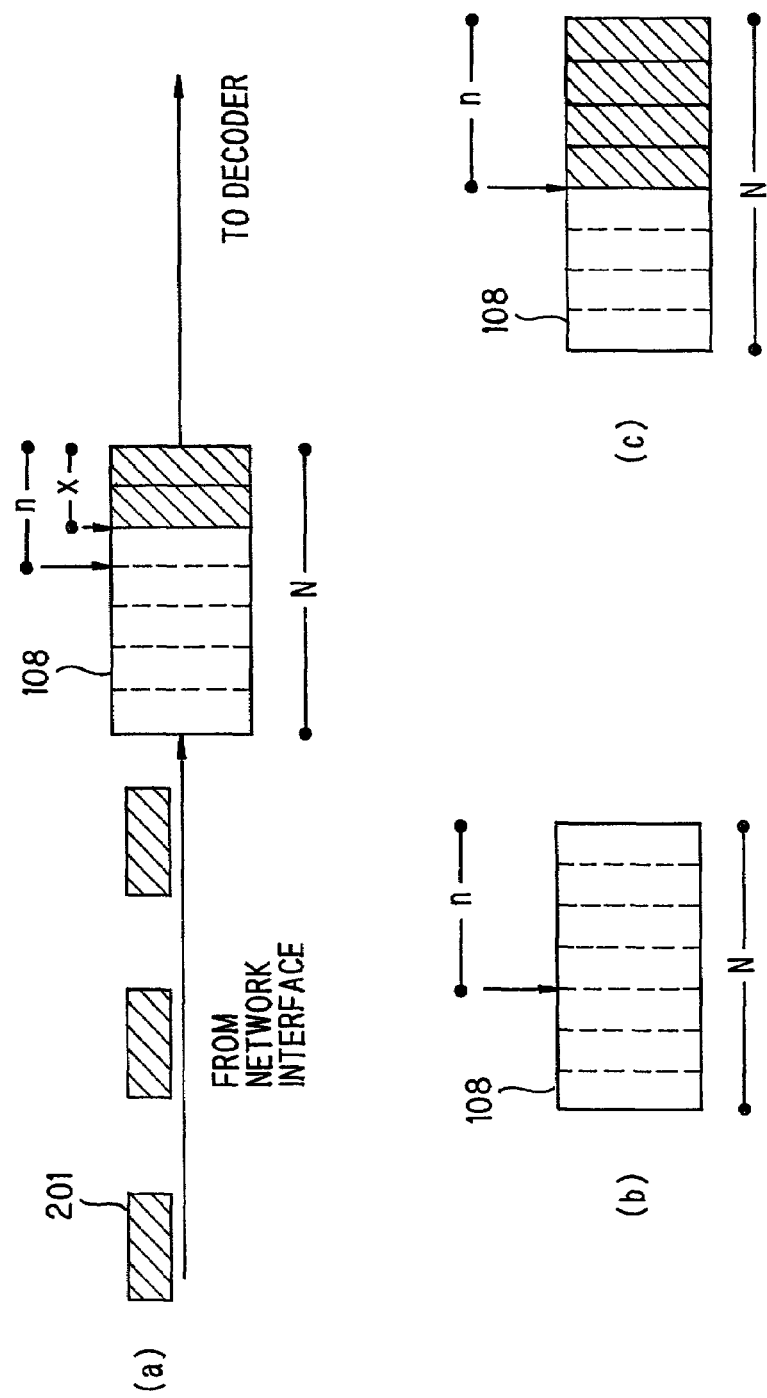
FIG. 4 is an illustrative view showing the operation of a receiving buffer.
Figure 5:
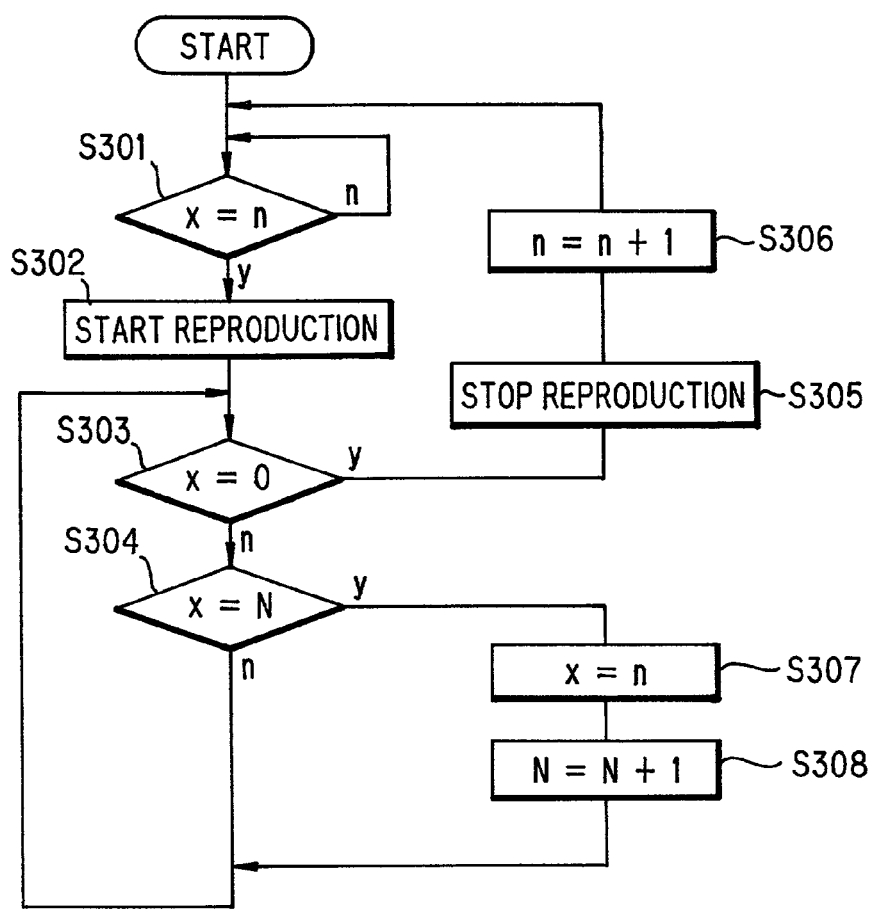
FIG. 5 is a flowchart for illustrating the operation of a reproduction controller controlling a receiving buffer.

FIG. 4 is an illustrative view showing the operation of the receiving buffer. FIG. 5 is a flowchart for illustrating the operation of the reproduction controller.

In FIG. 4, N designates the size of receiving buffer 108, n designates the reference value for received packets at which the received data starts to be reproduced, and x designates the number of packets in receiving buffer 108.

Packets 201 sent from network interface 104 are temporarily stored into receiving buffer 108, and transferred to decoder 109 in accordance with instruction from reproduction controller 106 so that the data is reproduced. In the flowchart in FIG. 5, packets are retained in receiving buffer 108 until x=n (S301). When x=n, reproduction of data is started (S302). Then reproduction controller 106 monitors the status of receiving buffer 108 and continues receiving packets and reproducing the data unless the relation x=0 (S303) or x=N (S304) holds.

Figure 6:
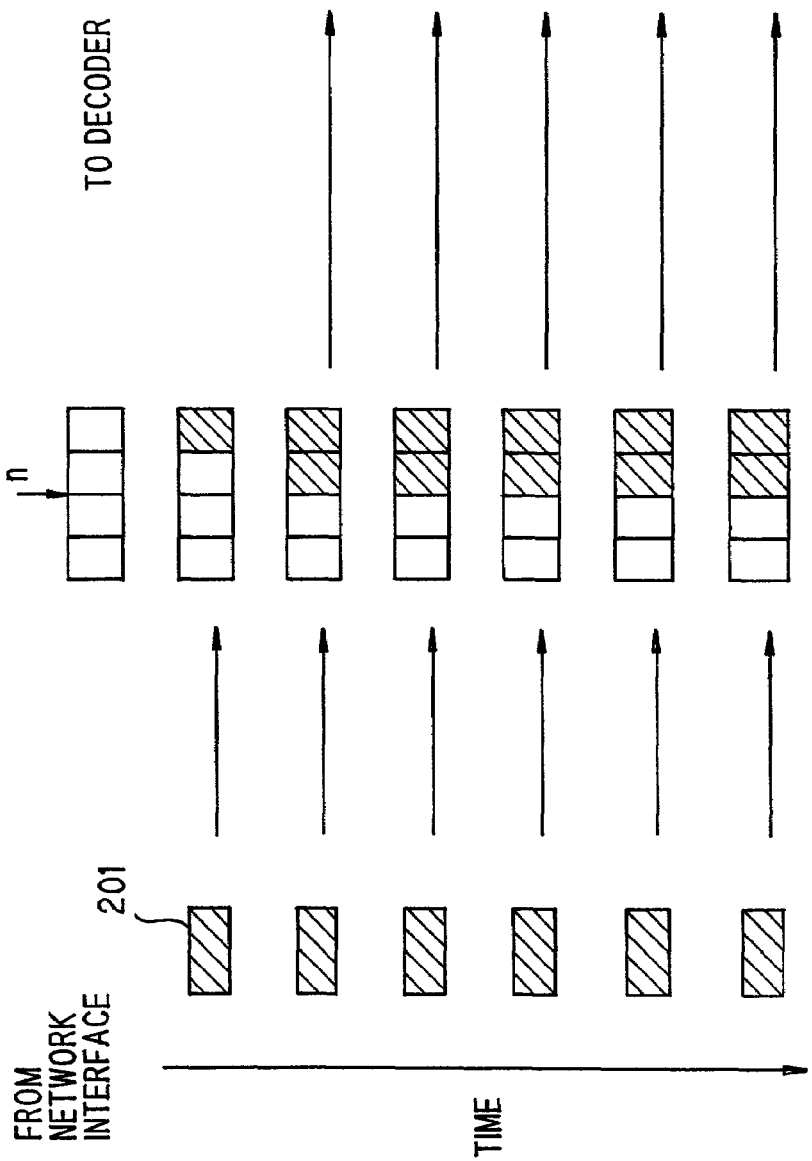
FIG. 6 is an illustrative view showing the states of a receiving buffer in a time-sequential manner.

FIG. 6 is an illustrative view showing the state of the receiving buffer in a time-sequential manner. As to the initial value of n, the operation should be started with n set at a value as small as 1 or 2 if the condition of the network is unknown. If the value which would cause jitter can be predicated beforehand, the initial value of n should be determined based on that value.

Referring next to the flowchart in FIG. 5, the operation when receiving buffer 108 has become empty so that x=0 (S303) will be described. This condition indicates the occurrence of underflow caused by the fact that arrivals of packets are delayed with respect to the reproduction clock due to network-induced jitter or difference in clocks between the terminal ends.

Figure 7:
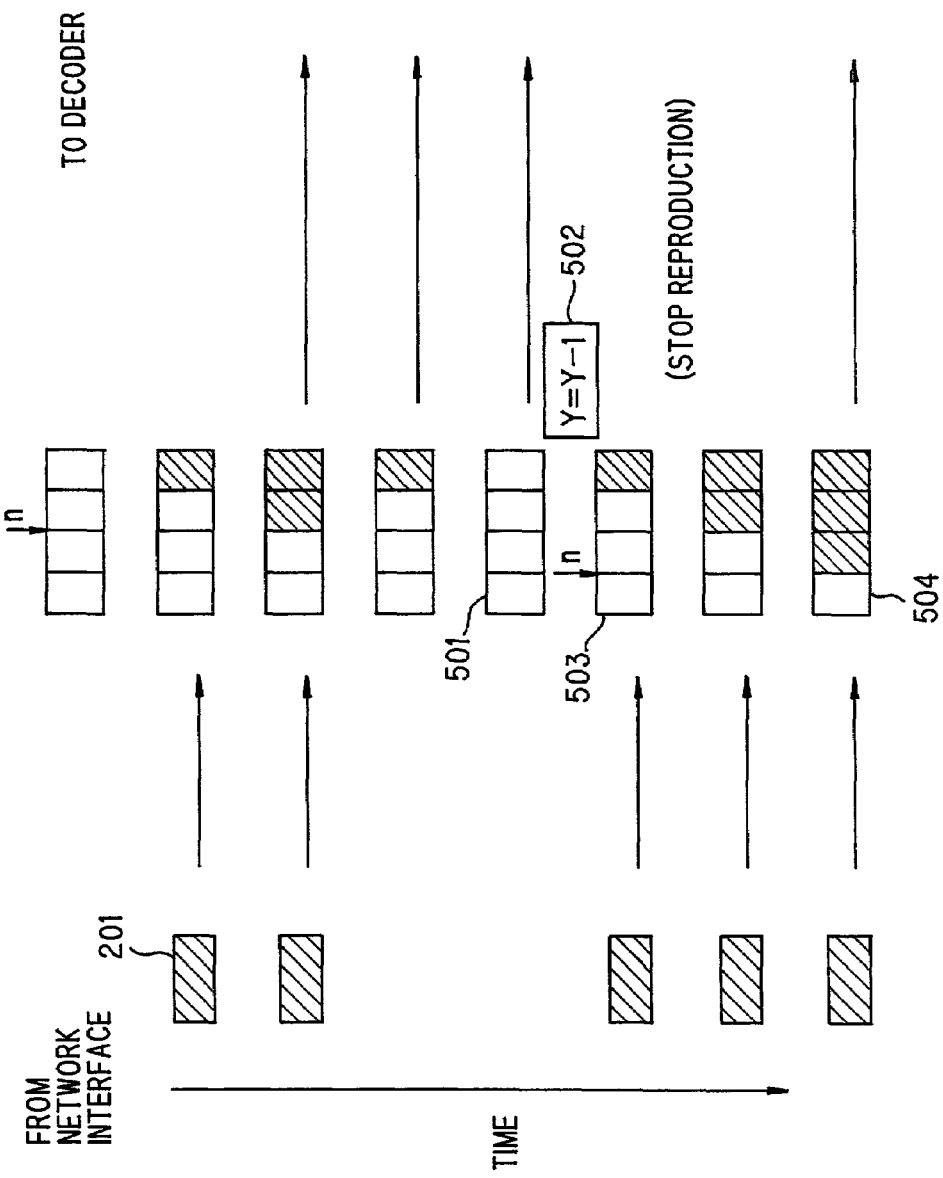
FIG. 7 is an illustrative view showing the state of received packets and a receiving buffer in a time-sequential manner.

Therefore, prevention of the occurrence of underflow is attempted by increasing the number of packets to be held in receiving buffer 108. When x=0 (S303), reproduction controller 106 collects packets into receiving buffer 108, stopping reproduction (S305) and increments the reference value for the number of received packets at which reproduction is started, or sets n=n+1 (S306). When the number of the packets in receiving buffer 108 becomes equal to n (S301), reproduction is started. The state of receiving buffer 108 in this case is shown in FIG. 4(b). Here, it is understood that n is incremented when receiving buffer 108 has become empty. FIG. 7 illustrates this situation in a time-sequential manner. Because of delay of the arrival of received packets 201 due to some reason, the buffer becomes empty (501), n is incremented (n=n+1) and reproduction is stopped (503). When x=n, reproduction is started (504).

Figure 8:
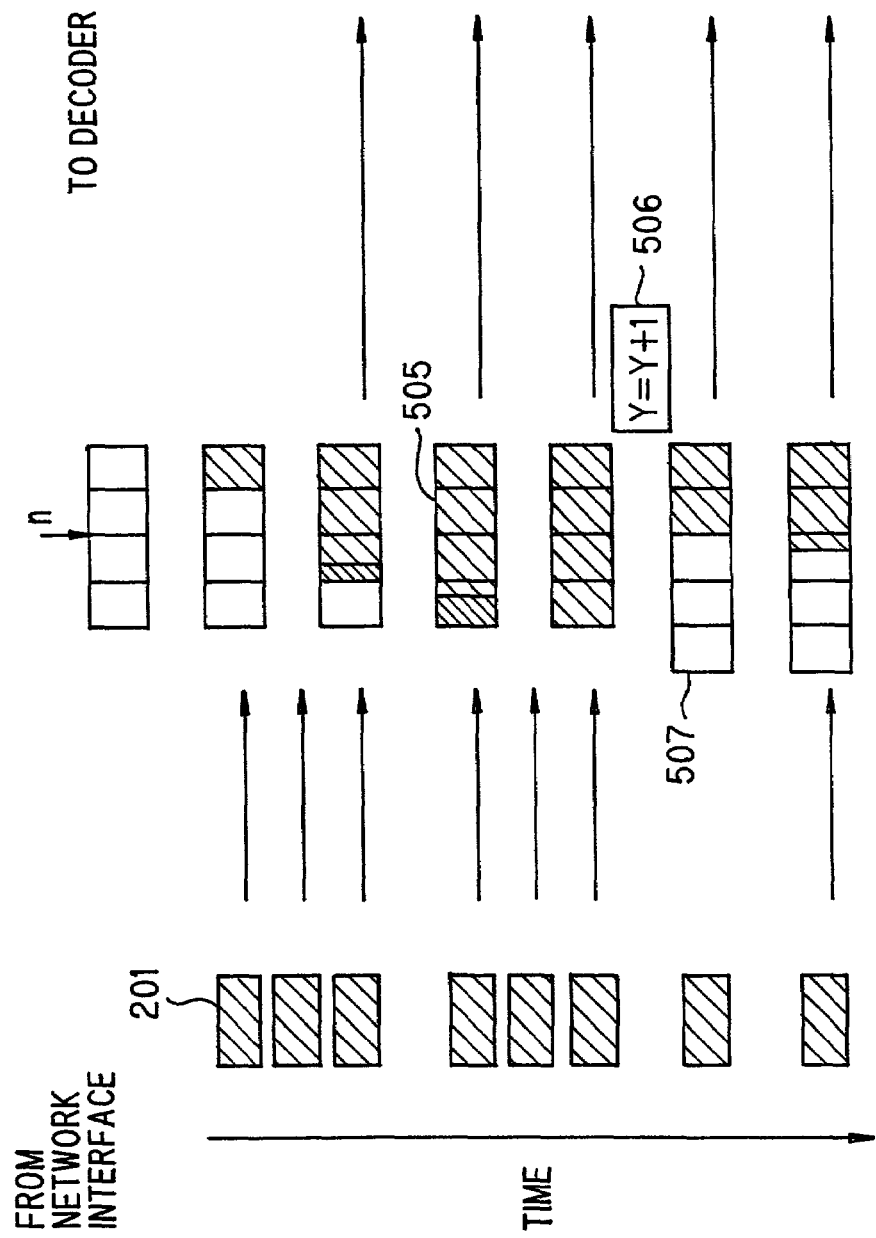
FIG. 8 is an illustrative view showing another state of received packets and a receiving buffer in a time-sequential manner.

Referring next to the flowchart in FIG. 5, the operation when x becomes equal to N in receiving buffer 108 (S304) will be described. This condition indicates the occurrence of overflow caused by the fact that packets have arrived faster than the clock on the reproduction side due to network-induced jitter or difference in clocks between terminal ends. Therefore, the occurrence of overflow is prevented by increasing the buffer size. When x=N (S304), reproduction controller 106 stops reception of packets and discards part of the packets held in receiving buffer 108 so that the state of buffer 108 is set at x=n (S307). Then, the receiving buffer size N is incremented (N=N+1) (S308). During this period, reproduction is continued and reception of packets is started again. FIG. 4(c) shows the state of receiving buffer 108 in this situation. It is understood that packets are discarded and the receiving buffer size N is incremented after the buffer has become full. FIG. 8 is an illustration for showing this situation in a time-sequential manner. Because of the early arrival of received packets 201 for some reason, buffer 108 becomes full (505), and after setting x=n and N=N+1 (506), reception of packets is restarted (507).

The reproduction control of the receiving buffer as above enables suitable reproduction control based on the number of received packets even if an overflow or underflow arises due to network-induced jitter or difference in reference clocks between terminal ends.

Figure 9:
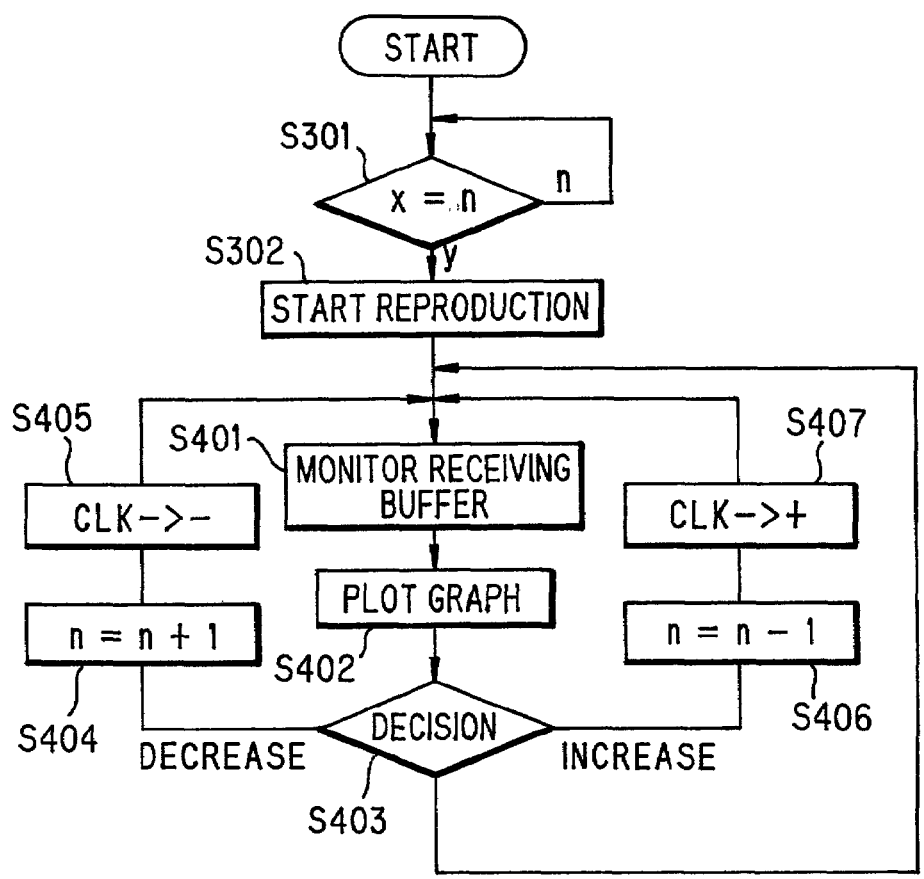
FIG. 9 is a flowchart for illustrating a method of detecting the difference between reference clocks on terminal ends.

FIG. 9 is a flowchart for illustrating a method of detecting the difference in reference clocks between terminal ends, used in the present invention. FIG. 10 shows illustrative charts for showing an example of the determining method when the state of the receiving buffer is monitored every fixed period.

In FIG. 9, packets are accumulated into receiving buffer 108 until x=n (S301). When x=n, then reproduction of the data is started (S302). Reproduction controller 106 monitors the number of packets in receiving buffer 108 every fixed period (S401) and plots the number (S402). FIG. 10 illustrates the plot results and the determining method. In FIG.

10(a), though the packet count x is found to vary to some extent, this variation is attributed to network induced jitter, so that it is possible to determine that no difference in frequency between the terminal ends. FIG. 10(b) shows decrease in the number of packets in the buffer due to frequency difference in addition to the variation due to jitter. FIG. 10(c) shows increase in the number of packets in the buffer due to frequency difference in addition to the variation due to jitter. When it is found from the plot result judgment (S403) that the number of packets in the buffer decreases due to frequency difference, n is incremented (n=n+1) (S404) and the frequency of the reference clock is varied so as to become smaller (S405). When increase in the number of packets in the buffer due to frequency difference is found from the plot result, n is decremented (n=n−1) (S406) and the frequency of the reference clock is varied so as to become greater (S407).

As to changing the value 'n' and changing the reference clock frequency from the plot result, changing one of them only is still effective.

Figure 11:
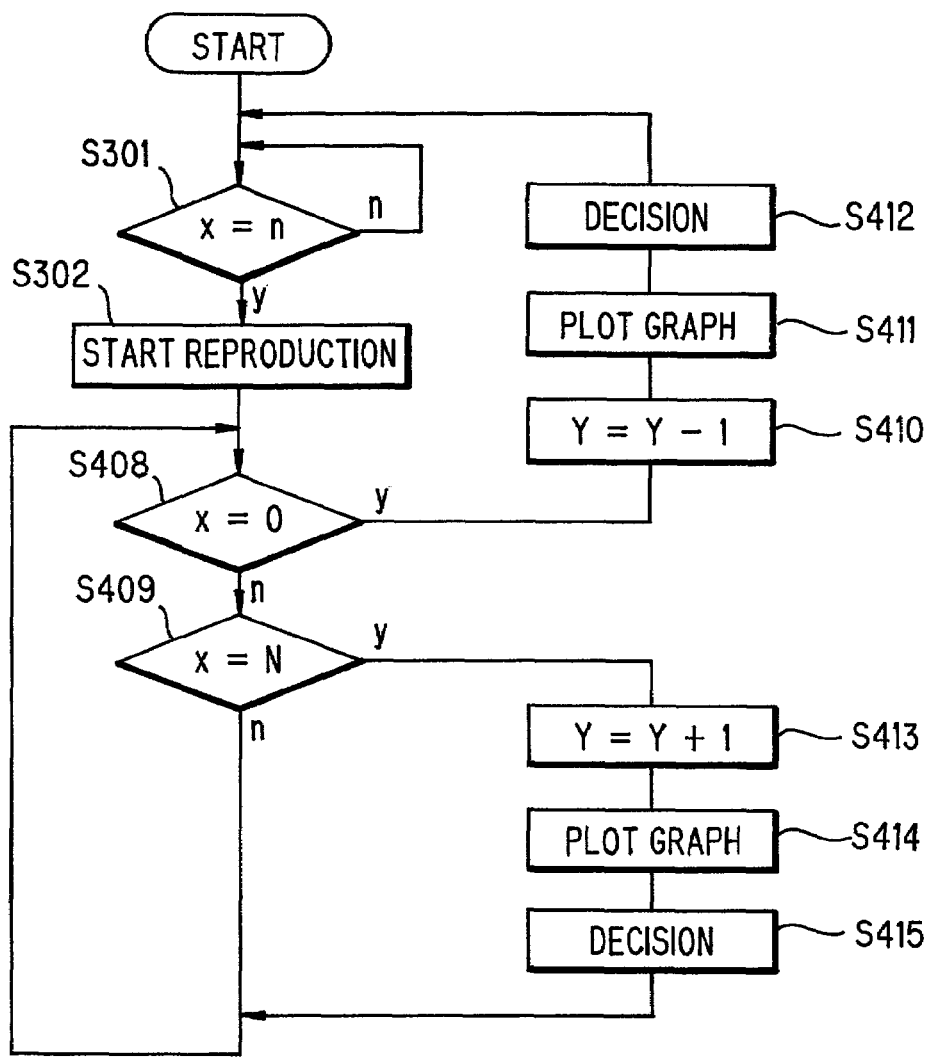
FIG. 11 is a flowchart for detecting the difference when a difference in reference clocks occurs.
Figure 13:
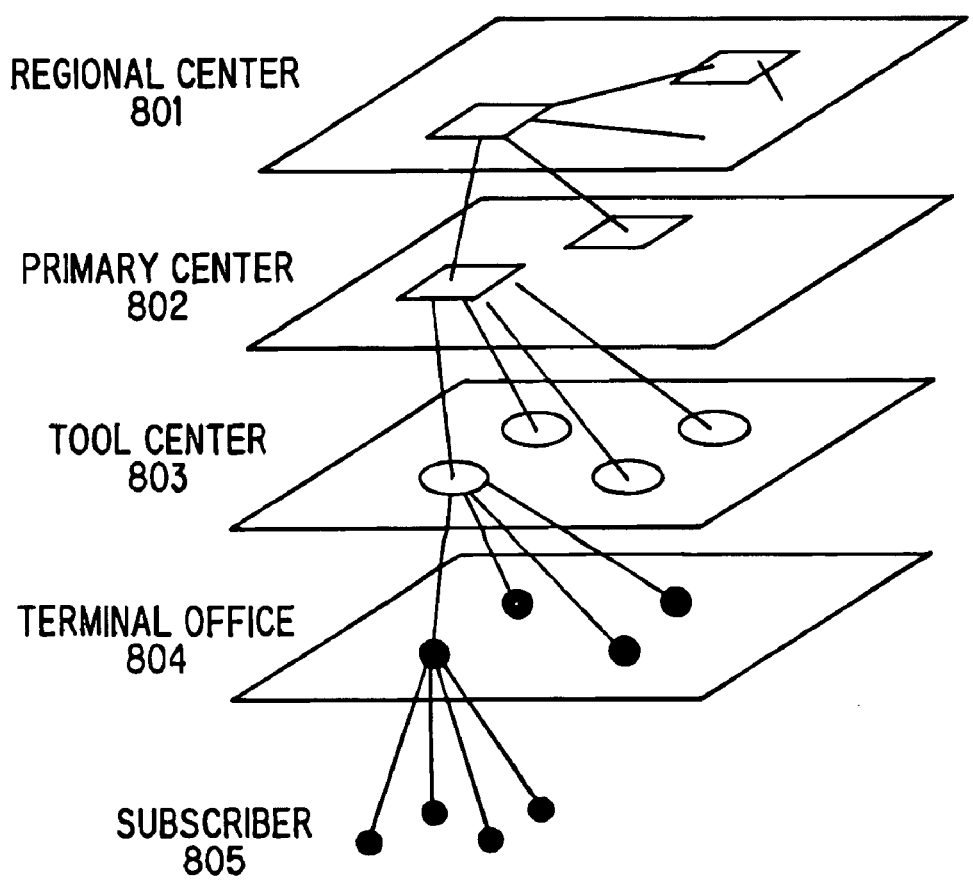
FIG. 13 is an illustrative view showing an example of communications networks for providing conventional telephone services.
Figure 14:
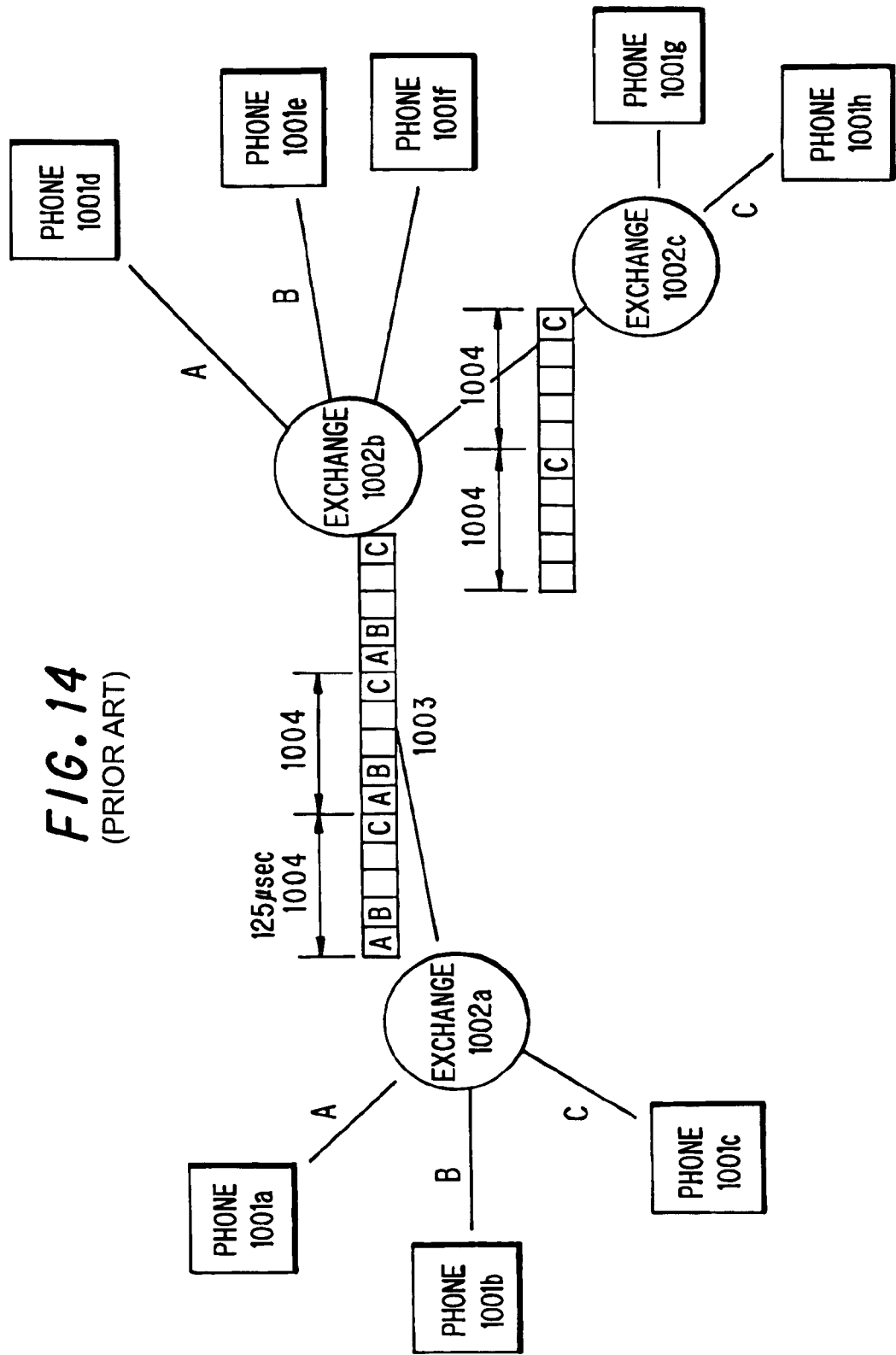
FIG. 14 is an illustrative view showing the concept of line switching based on time division multiplex system.
Figure 15:
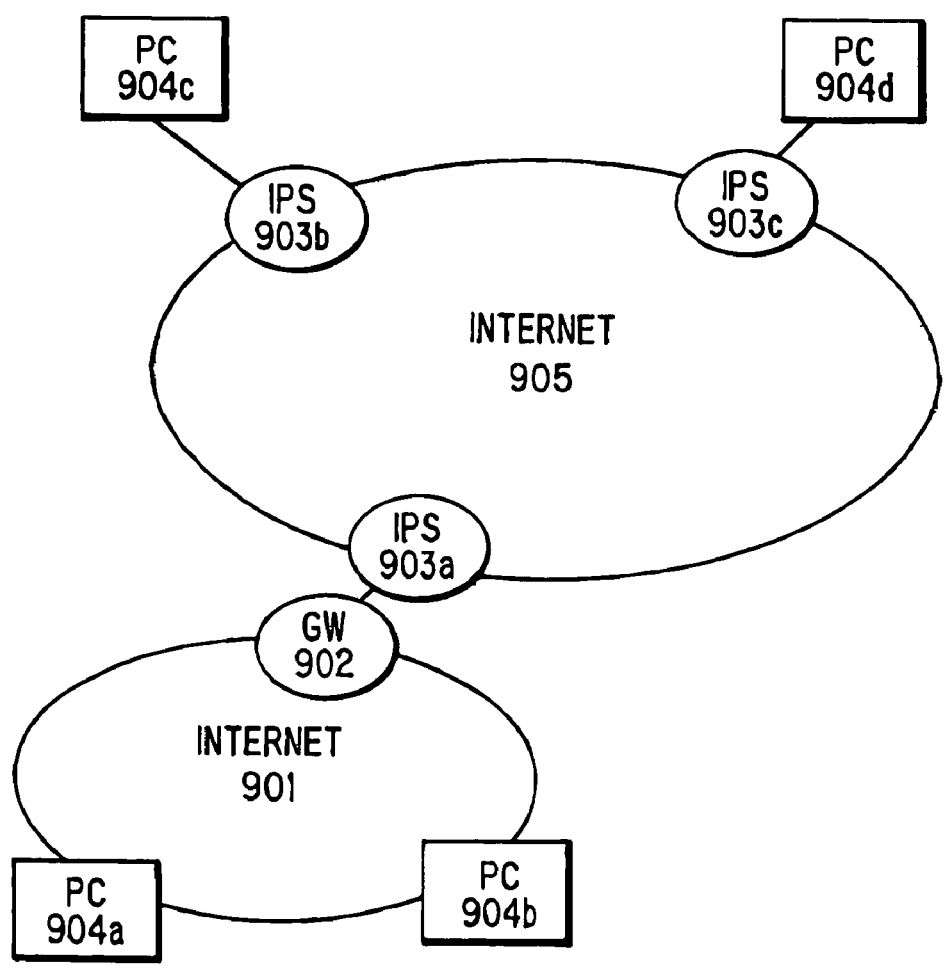
FIG. 15 is an illustrative view showing an example of communication between PCs using the Internet.
Figure 16:
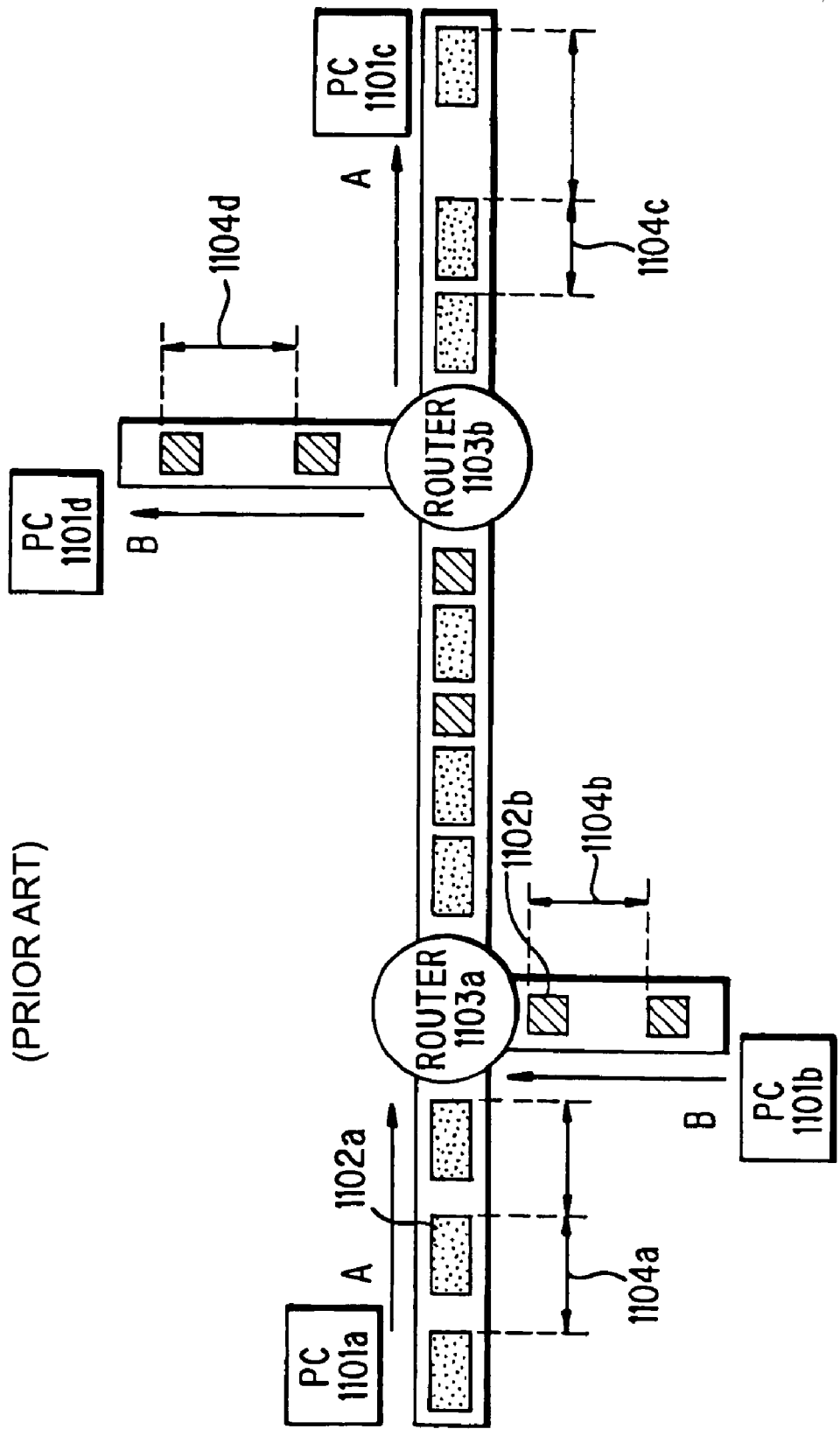
FIG. 16 is an illustrative view showing the concept when data is routed over the Internet.
Figure 17:
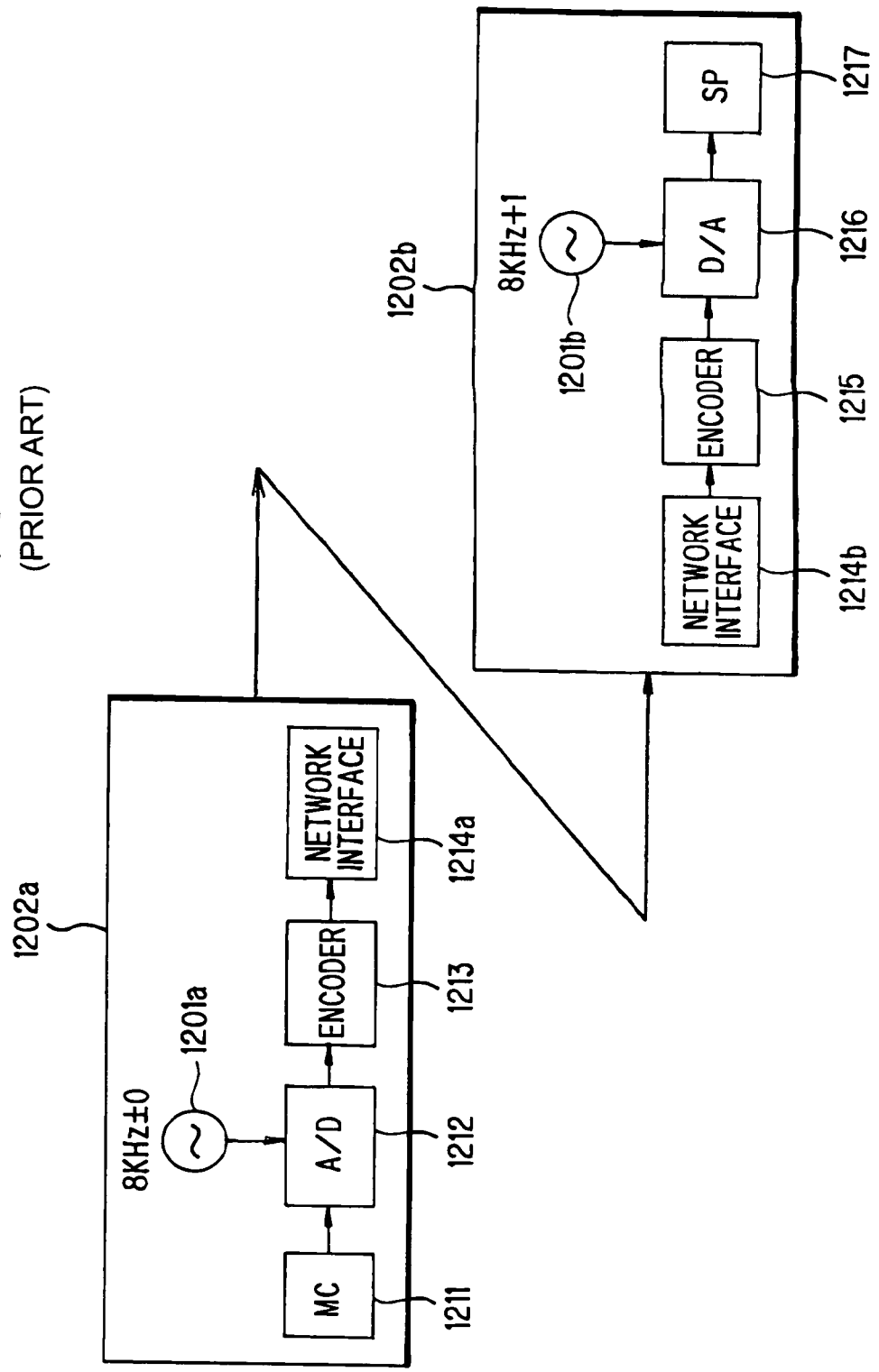
FIG. 17 is a block diagram showing a conventional packet communication apparatus where there is a difference in clocks between the transmitting end and receiving end.
Figure 18:
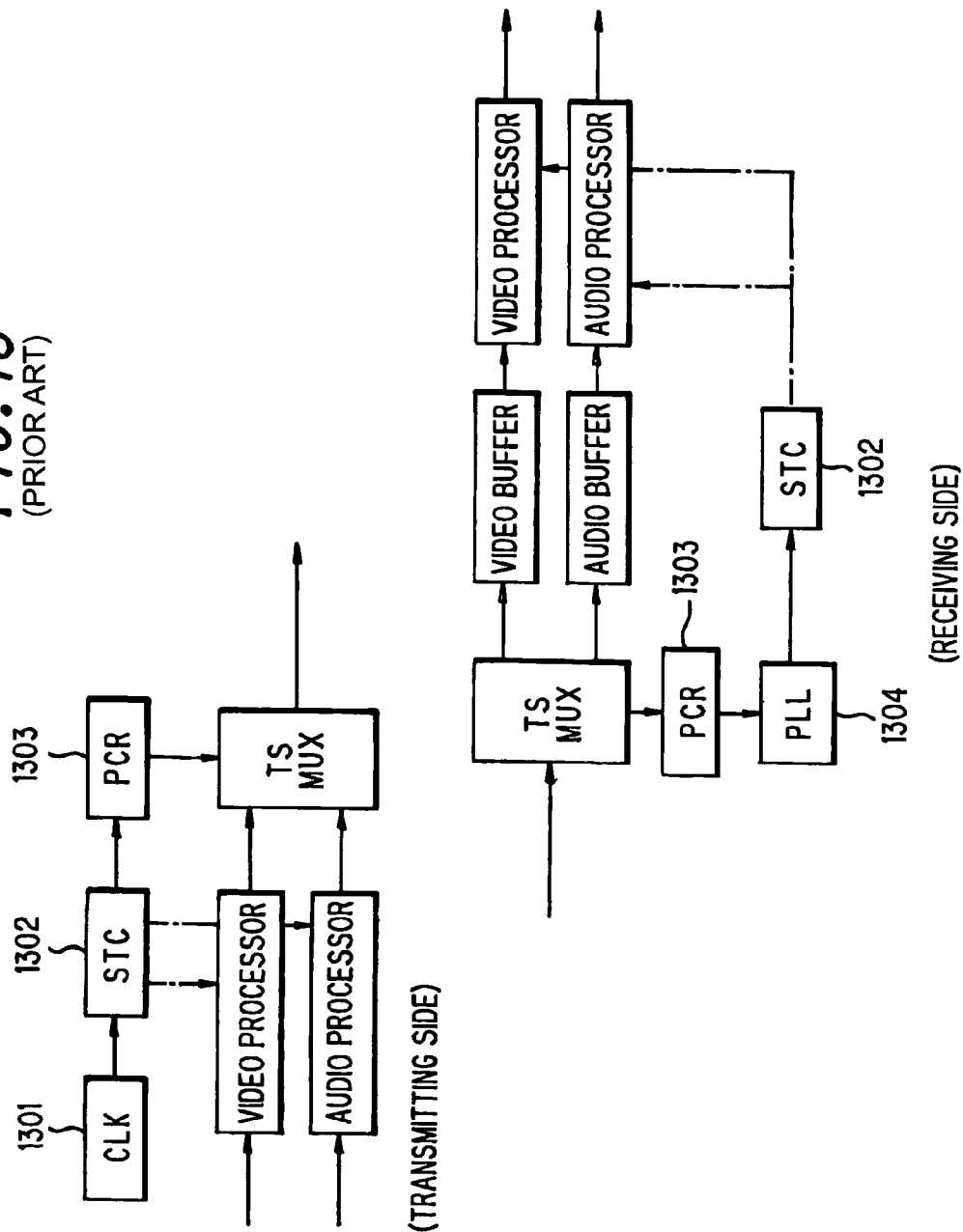
FIG. 18 is a block diagram showing a packet communication apparatus having a function of reproducing the reference clock, which is used for video and audio transmission over ATM based on MPEG2.

FIG. 11 shows the flow of plotting the number of events in the horizontal axis and a variable Y which represents the state of occurrence of events in the vertical axis when an event 'x=0' (S408) or 'x=N' (S409) occurs in the reproduction control of this invention. The plot starts from zero in the horizontal axis as shown in FIGS. 7 and 8 and increases by one every occurrence of an event. As to the vertical axis, the plot starts from Y=0, and variable Y is changed so that Y=Y−1 (S410) for n=0 (S408) and Y=Y+1 (S413) for n=N (S409) every time an event 'x=0' or 'x=N' occurs. The plot result and the determining method are shown in FIG. 7. In FIG. 12(a), no particular tendency is found as to occurrence of the events, and the occurrence of the events can be attributed to network induced jitter. Hence, it can be determined that there is no difference in frequency between the terminal ends. In FIG. 12(b), it is understood that there is a tendency toward underflow due to difference in frequency in addition to the fluctuation caused by jitter. In FIG. 12(c), it is understood that there is a tendency toward overflow due to difference in frequency in addition to the fluctuation caused by jitter. The operation of setting Y=Y−1 (S502) when x=0 is shown in FIG. 7, and the operation of setting Y=Y+1 (S504) when x=N is shown in FIG. 8.

From the result determination (S412 and S415) by plotting (S411 and S414) based on the above operations, the difference in frequency between the terminal ends may be corrected by changing the value 'n', modifying the frequency of the reference clock, or adjusting both in the same manner as described with reference to FIGS. 9 and 10.

As has been described, use of a packet processor of the present invention provides a simple method which can realize reception buffer control for reproducing data such as voice sound etc., in an optimal way by absorbing packet jitter which varies over time depending on the network status. Since non of temporal information from the transmitting side, which has been used in the conventional configuration, is used in the method of the present invention, the optimal control can be achieved on the receiving side only.

Also, since difference in reference clocks between the terminal ends, which may cause a problem in packet communication, can be detected by only monitoring the status of the receiving buffer when a particular event has occurred, it is possible to modify the difference in a simple, low-cost method without the necessity of a complex, expensive PLL circuit and/or high-precision reference clock.

Use of a recording medium in which the packet processing program of the present invention is stored enables jitter of received packets and clock difference, which could only be handled by the terminals with dedicated hardware, to be controlled in software by multi-purpose terminals such as PCs and the like.

INDUSTRIAL APPLICABILITY

As has been described heretofore, the packet processor according to the present invention is suitable for use with terminals and gateways which communicate voice sound and music over a packet-based network such as the Internet.

The invention claimed is:

1. A packet processor for processing packets of data received via a network to reproduce the data, comprising:
a receiving buffer for storing received packets;
a reproducing means for reproducing data of the packets based on a reproduction clock; and
a control means for performing control so as to reproduce data without breaks,
wherein the control means controls the packets stored in the receiving buffer by their number without using temporal information received with the packets, holds a reference value for the number of received packets, which is determined beforehand, and causes the reproducing means to start data reproduction when the number of packets exceeds the reference value; monitors a state of the receiving buffer and collects, when the packets in the buffer are used up, packets up to a level corresponding to the reference value before causing the reproducing means to restart data reproduction; and monitors the number of packets in the receiving buffer at intervals of a predetermined time period, and when a result shows increase or decrease in the number of packets with time, the control means, based on the result, modifies a receiving buffer size and the reference value for the number of received packets at which reproduction of data is started.

2. A packet processor for processing packets of data received via a network to reproduce the data, comprising:
a receiving buffer for storing received packets;
a reproducing means for reproducing data of the packets based on a reproduction clock; and
a control means for performing control so as to reproduce data without breaks,
wherein the control means controls the packets stored in the receiving buffer by their number without using temporal information received with the packets, holds a reference value for the number of received packets, which is determined beforehand, and causes the reproducing means to start data reproduction when the number of packets exceeds the reference value; monitors a state of the receiving buffer and discards, when the packets in the buffer exceed a predetermined buffer size, a fixed number of packets from the buffer; and monitors the number of packets in the receiving buffer at intervals of a predetermined time period, and when a result shows increase or decrease in the number of packets with time, the control means, based on the result, modifies the receiving buffer size and the reference value for the number of received packets at which reproduction of data is started.

3. A packet processor for processing packets of data received via a network to reproduce the data, comprising:
a receiving buffer for storing received packets;
a reproducing means for reproducing data of the packets based on a reproduction clock; and
a control means for performing control so as to reproduce data without breaks, wherein the control means controls the packets stored in the receiving buffer by their number without using temporal information received with the packets, holds a reference value for the number of received packets, which is determined beforehand, and causes the reproducing means to start data reproduction when the number of packets exceeds the reference value; monitors a state of the receiving buffer and modifies, when the packets in the buffer are used up, the reference value for the number of received packets at which reproduction of data is started, upon a next reproduction of data; and monitors the number of packets in the receiving buffer at intervals of a predetermined time period, and when a result shows increase or decrease in the number of packets with time, the control means, based on the result, modifies a receiving buffer size and the reference value for the number of received packets at which reproduction of data is started.

4. A packet processor for processing packets of data received via a network to reproduce the data, comprising:
a receiving buffer for storing received packets;
a reproducing means for reproducing data of the packets based on a reproduction clock; and
a control means for performing control so as to reproduce data without breaks,
wherein the control means controls the packets stored in the receiving buffer by their number without using temporal information received with the packets, holds a reference value for the number of received packets, which is determined beforehand, and causes the reproducing means to start data reproduction when the number of packets exceeds the reference value; monitors a state of the receiving buffer and modifies, when the packets in the buffer exceed a predetermined buffer size, the size of the receiving buffer; and monitors the number of packets in the receiving buffer at intervals of a predetermined time period, and when a result shows increase or decrease in the number of packets with time, the control means, based on the result, modifies the receiving buffer size and the reference value for the number of received packets at which reproduction of data is started.

5. A packet processor for processing packets of data received via a network to reproduce the data, comprising:
a receiving buffer for storing received packets;
a reproducing means for reproducing data of the packets based on a reproduction clock; and
a control means for performing control so as to reproduce data without breaks,
wherein the control means controls the packets stored in the receiving buffer by their number without using temporal information received with the packets, holds a reference value for the number of received packets, which is determined beforehand, and causes the reproducing means to start data reproduction when the number of packets exceeds the reference value; monitors a state of the receiving buffer and modifies, when the packets in the buffer are used up, the reference value for the number of received packets at which reproduction of data is started, upon a next reproduction of data; and monitors the number of packets in the receiving buffer at intervals of a predetermined time period, and when a result shows increase or decrease in the number of packets with time, the control means, based on the result, modifies a clock for data reproduction.

6. A packet processor for processing packets of data received via a network to reproduce the data, comprising:
a receiving buffer for storing received packets;
a reproducing means for reproducing data of the packets based on a reproduction clock; and
a control means for performing control so as to reproduce data without breaks,
wherein the control means controls the packets stored in the receiving buffer by their number without using temporal information received with the packets, holds a reference value for the number of received packets, which is determined beforehand, and causes the reproducing means to start data reproduction when the number of packets exceeds the reference value; monitors a state of the receiving buffer and modifies, when the packets in the buffer are used up, the reference value for the number of received packets at which reproduction of data is started, upon a next reproduction of data; and records modifications of the reference value for the number of received packets or a receiving buffer size, continuously from a start of a communication, and if recorded modifications of one type successively occur, the control means, based on the recorded modifications, modifies the receiving buffer size and the reference value for the number of received packets at which reproduction of data is started.

7. A packet processor for processing packets of data received via a network to reproduce the data, comprising:
a receiving buffer for storing received packets;
a reproducing means for reproducing data of the packets based on a reproduction clock; and
a control means for performing control so as to reproduce data without breaks,
wherein the control means controls the packets stored in the receiving buffer by their number without using temporal information received with the packets, holds a reference value for the number of received packets, which is determined beforehand, and causes the reproducing means to start data reproduction when the number of packets exceeds the reference number; monitors a state of the receiving buffer and modifies, when the packets in the buffer exceed exceeds a predetermined buffer size, the size of the receiving buffer; and records modifications of the reference value for the number of received packets or a receiving buffer size, continuously from a start of a communication, and if recorded modifications of one type successively occur, the control means, based on the recorded modifications, modifies the receiving buffer size and the reference value for the number of received packets at which reproduction of data is started.

8. A packet processor for processing packets of data received via a network to reproduce the data, comprising:
a receiving buffer for storing received packets;
a reproducing means for reproducing data of the packets based on a reproduction clock; and
a control means for performing control so as to reproduce data without breaks,
wherein the control means controls the packets stored in the receiving buffer by their number without using temporal information received with the packets, holds a reference value for the number of received packets, which is determined beforehand, and causes the reproducing means to start data reproduction when the number of packets exceeds the reference value; monitors a state of the receiving buffer and modifies, when the packets in the buffer are used up, the reference value for the number of received packets at which reproduction of data is started, upon a next reproduction of data; and records modifications of the reference value for the number of received packets or a receiving buffer size, continuously from a start of a communication, and if recorded modifications of one type successively occur, the control means, based on the recorded modifications, modifies a clock for data reproduction.

9. A packet processor for processing packets of data received via a network to reproduce the data, comprising:
a receiving buffer for storing received packets;
a reproducing means for reproducing data of the packets based on a reproduction clock; and
a control means for performing control so as to reproduce data without breaks,
wherein the control means controls the packets stored in the receiving buffer by their number without using temporal information received with the packets, holds a reference value for the number of received packets, which is determined beforehand, and causes the reproducing means to start data reproduction when the number of packets exceeds the reference value; monitors a state of the receiving buffer and modifies, when the packets in the buffer exceed a predetermined buffer size, the size of the receiving buffer; and records modifications of the reference value for the number of received packets or the receiving buffer size, continuously from a start of a communication, and if recorded modifications of one type successively occur, the control means, based on the recorded modifications, modifies a clock for data reproduction.

10. A recording medium holding a packet processing program for use in a packet processor for processing packets of data received via a network to reproduce the data, wherein the packet processor comprises a receiving buffer for storing received packets; a reproducing means for reproducing data of the packets based on a reproduction clock; and a control means for performing control so as to reproduce data without breaks, and
wherein the packet processing program is characterized in that the control means is adapted to control the packets stored in the receiving buffer by their number without using temporal information received with the packets, hold a reference value for the number of received packets, which is determined beforehand, and cause the reproducing means to start data reproduction when the number of packets exceeds the reference value; the control means is adapted to monitor a state of the receiving buffer and collect, when the packets in the buffer are used up, packets up to a level corresponding to the reference value before causing the reproducing means to restart data reproduction; and the control means is adapted to monitor the number of packets in the receiving buffer at intervals of a predetermined time period and when a result shows increase or decrease in the number of packets with time, the control means is operated to modify, based on the result, a receiving buffer size and the reference value for the number of received packets at which reproduction of data is started.

11. A recording medium holding a packet processing program for use in a packet processor for processing packets of data received via a network to reproduce the data, wherein the packet processor comprises a receiving buffer for storing received packets; a reproducing means for reproducing data of the packets based on a reproduction clock; and a control means for performing control so as to reproduce data without breaks, and
wherein the packet processing program is characterized in that the control means is adapted to control the packets stored in the receiving buffer by their number without using temporal information received with the packets, hold a reference value for the number of received packets, which is determined beforehand, and cause the reproducing means to start data reproduction when the number of packets exceeds the reference value; the control means is adapted to monitor a state of the receiving buffer and discard, when the packets in the buffer exceed a predetermined buffer size, a fixed number of packets from the buffer; and the control means is adapted to monitor the number of packets in the receiving buffer at intervals of a predetermined time period and when a result shows increase or decrease in the number of packets with time, the control means is operated to modify, based on the result, the receiving buffer size and the reference value for the number of received packets at which reproduction of data is started.

12. A recording medium holding a packet processing program for use in a packet processor for processing packets of data received via a network to reproduce the data, wherein the packet processor comprises a receiving buffer for storing received packets; a reproducing means for reproducing data of the packets based on a reproduction clock; and a control means for performing control so as to reproduce data without breaks, and
wherein the packet processing program is characterized in that the control means is adapted to control the packets stored in the receiving buffer by their number without using temporal information received with the packets, hold a reference value for the number of received packets, which is determined beforehand, and cause the reproducing means to start data reproduction when the number of packets exceeds the reference value; the control means is adapted to monitor a state of the receiving buffer and modify, when the packets in the buffer are used up, the reference value for the number of received packets at which reproduction of data is started, upon a next reproduction of data; and the control means is adapted to monitor the number of packets in the receiving buffer at intervals of a predetermined time period and when a result shows increase or decrease in the number of packets with time, the control means is operated to modify, based on the result, a receiving buffer size and the reference value for the number of received packets at which reproduction of data is started.

13. A recording medium holding a packet processing program for use in a packet processor for processing packets of data received via a network to reproduce the data, wherein the packet processor comprises a receiving buffer for storing received packets; a reproducing means for reproducing data of the packets based on a reproduction clock; and a control means for performing control so as to reproduce data without breaks, and
wherein the packet processing program is characterized in that the control means is adapted to control the packets stored in the receiving buffer by their number without using temporal information received with the packets, hold a reference value for the number of received packets, which is determined beforehand, and cause the reproducing means to start data reproduction when the number of packets exceeds the reference value; the control means is adapted to monitor a state of the receiving buffer and modify, when the packets in the buffer exceed a predetermined buffer size, the size of the receiving buffer; and the control means is adapted to monitor the number of packets in the receiving buffer at intervals of a predetermined time period and when a result shows increase or decrease in the number of packets with time, the control means is operated to modify, based on the result, the receiving buffer size and the reference value for the number of received packets at which reproduction of data is started.

14. A recording medium holding a packet processing program for use in a packet processor for processing packets of data received via a network to reproduce the data, wherein the packet processor comprises a receiving buffer for storing received packets; a reproducing means for reproducing data of the packets based on a reproduction clock; and a control means for performing control so as to reproduce data without breaks, and wherein the packet processing program is characterized in that the control means is adapted to control the packets stored in the receiving buffer by their number without using temporal information received with the packets, hold a reference value for the number of received packets, which is determined beforehand, and cause the reproducing means to start data reproduction when the number of packets exceeds the reference value; the control means is adapted to monitor a state of the receiving buffer and modify, when the packets in the buffer are used up, the reference value for the number of received packets at which reproduction of data is started, upon a next reproduction of data; and the control means is adapted to monitor the number of packets in the receiving buffer at intervals of a predetermined time period and when a result shows increase or decrease in the number of packets with time, the control means is operated to modify, based on the result, a clock for data reproduction.

15. A recording medium holding a packet processing program for use in a packet processor for processing packets of data received via a network to reproduce the data, wherein the packet processor comprises a receiving buffer for storing received packets; a reproducing means for reproducing data of the packets based on a reproduction clock; and a control means for performing control so as to reproduce data without breaks, and wherein the packet processing program is characterized in that the control means is adapted to control the packets stored in the receiving buffer by their number without using temporal information received with the packets, hold a reference value for the number of received packets, which is determined beforehand, and cause the reproducing means to start data reproduction when the number of packets exceeds the reference value; the control means is adapted to monitor a state of the receiving buffer and modify, when the packets in the buffer are used up, the reference value for the number of received packets at which reproduction of data is started, upon a next reproduction of data; and the control means is adapted to record modifications of the reference value for the number of received packets or a receiving buffer size, continuously from a start of a communication, and if recorded modifications of one type successively occur, the control means is operated to modify, based on the recorded modifications, the receiving buffer size and the reference value for the number of received packets at which reproduction of data is started.

16. A recording medium holding a packet processing program for use in a packet processor for processing packets of data received via a network to reproduce the data, wherein the packet processor comprises a receiving buffer for storing received packets; a reproducing means for reproducing data of the packets based on a reproduction clock; and a control means for performing control so as to reproduce data without breaks, and wherein the packet processing program is characterized in that the control means is adapted to control the packets stored in the receiving buffer by their number without using temporal information received with the packets, hold a reference value for the number of received packets, which is determined beforehand, and cause the reproducing means to start data reproduction when the number of packets exceeds the reference value; the control means is adapted to monitor a state of the receiving buffer and modify, when the packets in the buffer exceed a predetermined buffer size, the size of the receiving buffer; and the control means is adapted to record modifications of the reference value for the number of received packets or the receiving buffer size, continuously from a start of a communication, and if recorded modifications of one type successively occur, the control means is operated to modify, based on the recorded modifications, the receiving buffer size and the reference value for the number of received packets at which reproduction of data is started.

17. A recording medium holding a packet processing program for use in a packet processor for processing packets of data received via a network to reproduce the data, wherein the packet processor comprises a receiving buffer for storing received packets; a reproducing means for reproducing data of the packets based on a reproduction clock; and a control means for performing control so as to reproduce data without breaks, and wherein the packet processing program is characterized in that the control means is adapted to control the packets stored in the receiving buffer by their number without using temporal information received with the packets, hold a reference value for the number of received packets, which is determined beforehand, and cause the reproducing means to start data reproduction when the number of packets exceeds the reference value; the control means is adapted to monitor a state of the receiving buffer and modify, when the packets in the buffer are used up, the reference value for the number of received packets at which reproduction of data is started, upon a next reproduction of data; and the control means is adapted to record modifications of the reference value for the number of received packets or a receiving buffer size, continuously from a start of a communication, and if recorded modifications of one type successively occur, the control means is adapted to modify, based on the recorded modifications, a clock for data reproduction.

18. A recording medium holding a packet processing program for use in a packet processor for processing packets of data received via a network to reproduce the data, wherein the packet processor comprises a receiving buffer for storing received packets; a reproducing means for reproducing data of the packets based on a reproduction clock; and a control means for performing control so as to reproduce data without breaks, and wherein the packet processing program is characterized in that the control means is adapted to control the packets stored in the receiving buffer by their number without using temporal information received with the packets, hold a reference value for the number of received packets, which is determined beforehand, and cause the reproducing means to start data reproduction when the number of packets exceeds the reference value; the control means is adapted to monitor a state of the receiving buffer and modify, when the packets in the buffer exceed a predetermined buffer size, the size of the receiving buffer; and the control means is adapted to record modifications of the reference value for the number of received packets or the receiving buffer size, continuously from a start of a communication, and if recorded modifications of one type successively occur, the control means is adapted to modify, based on the recorded modifications, a clock for data reproduction.

19. A packet processor for processing packets of data received via a network, comprising:

a receiving buffer for storing received packets; and a controller that controls packets stored in the receiving buffer by their number without using temporal information received with the packets, holds a reference value for the number of received packets, and initiates data reproduction when the number of packets in the receiving buffer exceeds the reference value; monitors a state of the receiving buffer and collects, when the packets in the receiving buffer are used up, packets up to a level corresponding to the reference value before initiating a restart of data reproduction; and monitors the number of packets in the receiving buffer at specified time intervals, and when a result of the packet number monitoring shows non-jitter-induced increases or decreases over time in the number of packets in the receiving buffer, modifies both a receiving buffer size and the reference value for the number of received packets at which reproduction of data is initiated.

20. A recording medium storing a packet processing program for processing packets of data received via a network, the packet processing program which, when executed, performs a method comprising:

storing received packets;

controlling packets stored in the receiving buffer by their number without using temporal information received with the packets, holding a reference value for the number of received packets, and initiating data reproduction when the number of packets in the receiving buffer exceeds the reference value;

monitoring a state of the receiving buffer and collecting, when the packets in the receiving buffer are used up, packets up to a level corresponding to the reference value before initiating a restart of data reproduction; and monitoring the number of packets in the receiving buffer at specified time intervals, and when a result of the packet number monitoring shows non-jitter-induced increases or decreases over time in the number of packets in the receiving buffer, modifying both a receiving buffer size and the reference value for the number of received packets at which reproduction of data is initiated.

* * * * *